United States Patent
Mayer

(10) Patent No.: US 10,812,209 B2
(45) Date of Patent: Oct. 20, 2020

(54) METHOD AND APPARATUS FOR PROVISION OF TIMING FOR A COMMUNICATION NETWORK

(71) Applicant: Michael Mayer, Ottawa (CA)

(72) Inventor: Michael Mayer, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 15/632,832

(22) Filed: Jun. 26, 2017

(65) Prior Publication Data

US 2018/0375603 A1  Dec. 27, 2018

(51) Int. Cl.
H04L 12/26 (2006.01)
H04J 3/06 (2006.01)
H04W 56/00 (2009.01)

(52) U.S. Cl.
CPC .......... *H04J 3/0652* (2013.01); *H04J 3/0638* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 2001/0041573 A1* | 11/2001 | Ishii | H04B 1/7113 455/450 |
| 2006/0291537 A1 | 12/2006 | Fullerton et al. | |
| 2014/0362711 A1* | 12/2014 | Jiang | H04W 24/02 370/252 |
| 2016/0135057 A1* | 5/2016 | Wang | H04L 5/0057 455/454 |
| 2016/0330706 A1 | 11/2016 | Liu et al. | |
| 2017/0373880 A1* | 12/2017 | Zhang | G06F 13/426 |
| 2018/0097678 A1 | 4/2018 | Zhou et al. | |
| 2018/0205476 A1 | 7/2018 | Wang et al. | |
| 2019/0335338 A1 | 10/2019 | Wang et al. | |

FOREIGN PATENT DOCUMENTS

| | | |
|---|---|---|
| CN | 105262555 A | 1/2016 |
| CN | 106465307 A | 2/2017 |
| CN | 106549806 A | 3/2017 |
| CN | 106657194 A | 5/2017 |

(Continued)

OTHER PUBLICATIONS

3GPP TR 22.891 entitled "Feasibility Study on New Services and Markets Technology Enablers" V14.2.0, Sep. 2016.

(Continued)

*Primary Examiner* — Zewdu A Beyen

(57) ABSTRACT

Methods and apparatuses for the provision of timing for a communication network are disclosed. In particular, timing can be provided as a service to the communication network and the network slices operating thereon. This provision of timing as a service (TaaS) can enable the synchronization of operation of the various network components which in some instances can be physically placed at different locations while providing a desired functionality. According to embodiments, a timing slice is configured to provide the portion of timing resources that are associated with the delivery of timing to a slave device in an environment where multiple network slices are operating.

15 Claims, 9 Drawing Sheets

(56) References Cited

FOREIGN PATENT DOCUMENTS

| CN | 106788931 A | 5/2017 |
| WO | 2015006954 A1 | 1/2015 |
| WO | 2017037687 A1 | 3/2017 |

OTHER PUBLICATIONS

"3GPP Ts 22.261 V15.0.0 (Mar. 2017), 3rd Generation Partnership Project; Technical Specification Group Services and System Aspects;Service requirements for the 5G system;Stage 1(Release 15), 48 pages".

Huawei Tech (UK) Co et al: "ETSI GR mWT 016 v0.0.6 (May 2017), Applications and use cases of Software Defined Networking as related to microwave and millimetre wave transmission", 2017, pp. 1-35, XP014295580.

\* cited by examiner

METHOD AND APPARATUS FOR PROVISION OF TIMING FOR A COMMUNICATION NETWORK

FIELD OF THE INVENTION

The present invention pertains to the field communication networks and in particular to the provision of timing for a communication network.

BACKGROUND

Many services running on modern digital telecommunication networks require accurate synchronization for correct operation. For example, time division multiplexing (TDM) switches do not operate with the same clock rates, then slips will occur and degrade performance. Telecommunication networks rely on the use of highly accurate primary reference clocks which are distributed network wide using synchronization links and synchronization supply units. There are several protocols used for the provision of timing in communication networks, including Network Time Protocol (NTP) and Precision Time Protocol (PTP).

NTP is a networking protocol for clock synchronization between computer systems over packet-switched, variable-latency data networks. NTP is intended to synchronize all participating computers to within a few milliseconds of Coordinated Universal Time (UTC). NTP can usually maintain time to within tens of milliseconds over the public Internet, and can achieve better than one millisecond accuracy in local area networks under ideal conditions. The NTP protocol is usually described in terms of a client-server model, but can as easily be used in peer-to-peer relationships where both peers consider the other to be a potential time source. NTP uses a hierarchical, semi-layered system of time sources. Each level of this hierarchy is termed a "stratum" and is assigned a number starting with zero at the top. For example a server synchronized to a stratum n server will be running at stratum n+1, wherein the stratum number represents the distance from the reference clock PTP is a protocol used to synchronize clocks throughout a computer network. On a local area network, PTP can achieve clock accuracy in the sub-microsecond range, making it suitable for measurement and control systems. PTP is defined in IEEE 1588 and was designed to fill a niche which was not well served by either of the two dominant protocols, namely NTP and GPS. IEEE 1588 is designed for local systems requiring accuracies beyond those attainable using NTP. It is also designed for applications that cannot bear the cost of a GPS receiver at each node, or for which GPS signals are inaccessible. The IEEE 1588 standard describes a hierarchical, master-slave architecture for clock distribution. Under this architecture, a time distribution system includes one or more communication media (e.g. network segments), and one or more clocks. An ordinary clock is a device with a single network connection and is either the source (e.g. the master) of a synchronization reference or a destination (e.g. slave) for a synchronization reference. A boundary clock has multiple network connections and can accurately synchronize one network segment to another. A synchronization master is selected for each of the network segments in the system. The root timing reference is called the Grand Master clock, wherein the Grand Master transmits synchronization information to the clocks residing on its network segment. The boundary clocks with a presence on that segment then calculate and relay accurate time to the other segments to which they are also connected.

Communication networks enabled by technologies such as Network Function Virtualization (NFV), and Software Defined Networking (SDN) can be flexibly organized so as to serve various customer demands. Network slicing can provide a means to offer network services in wireless networks. Through the use of NFV, and network slicing, a dynamic network responsive to the immediate needs of the users can be provided.

However, various implementation issues remain to be addressed within the domain of network slicing for communication networks in order to properly define an architecture that is sufficiently scalable and reliable for next generation wireless networks. One of these implementation issues is the provision of timing which can be used for synchronization of the components of a communication network.

Therefore there is a need for a method and apparatus for provision of timing to a communication network, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide method and apparatus for provision of timing for a communication network. In accordance with an aspect of the present invention, there is provided a method for provisioning timing to a network slice of a communication network. The method includes receiving, by a timing slice controller, a base time reference signal and one or more network slice configuration parameters. The method further includes determining, by the timing slice controller, timing synchronization information based at least in part on the base time reference signal and the one or more network slice configuration parameters and transmitting, by the timing slice controller, the timing synchronization information to a network entity associated with the network slice.

In accordance with another aspect of the present invention, which can be combined with any of the preceding embodiments, there is provided a device for provisioning timing to a network slice of a communication network. The device includes a processor and machine readable memory storing machine executable instructions. The machine readable instructions, which when executed by the processor configure the device to receive a base time reference signal and one or more network slice configuration parameters. The machine readable instructions, upon execution can further configure the device to determine timing synchronization information based at least in part on the base time reference signal and the one or more network slice configuration parameters and transmit the timing synchronization information to a network entity associated with the network slice.

In accordance with another aspect of the present invention, which can be combined with any of the preceding embodiments, there is provided method for synchronizing timing for a network slice with a base timing source. The method includes transmitting, by a network entity, one or more network slice configuration parameters and receiving, by the network entity, timing synchronization information for synchronization of the network slice with the base timing source.

In accordance with another aspect of the present invention, which can be combined with any of the preceding embodiments, there is provided a device for synchronizing timing for a network slice with a base timing source. The device includes a processor and a machine readable memory storing machine executable instructions. The machine executable instruction, which when executed by the processor, configure the device to transmit one or more network slice configuration parameters and receive timing synchronization information for synchronization of the network slice with the base timing source.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1:
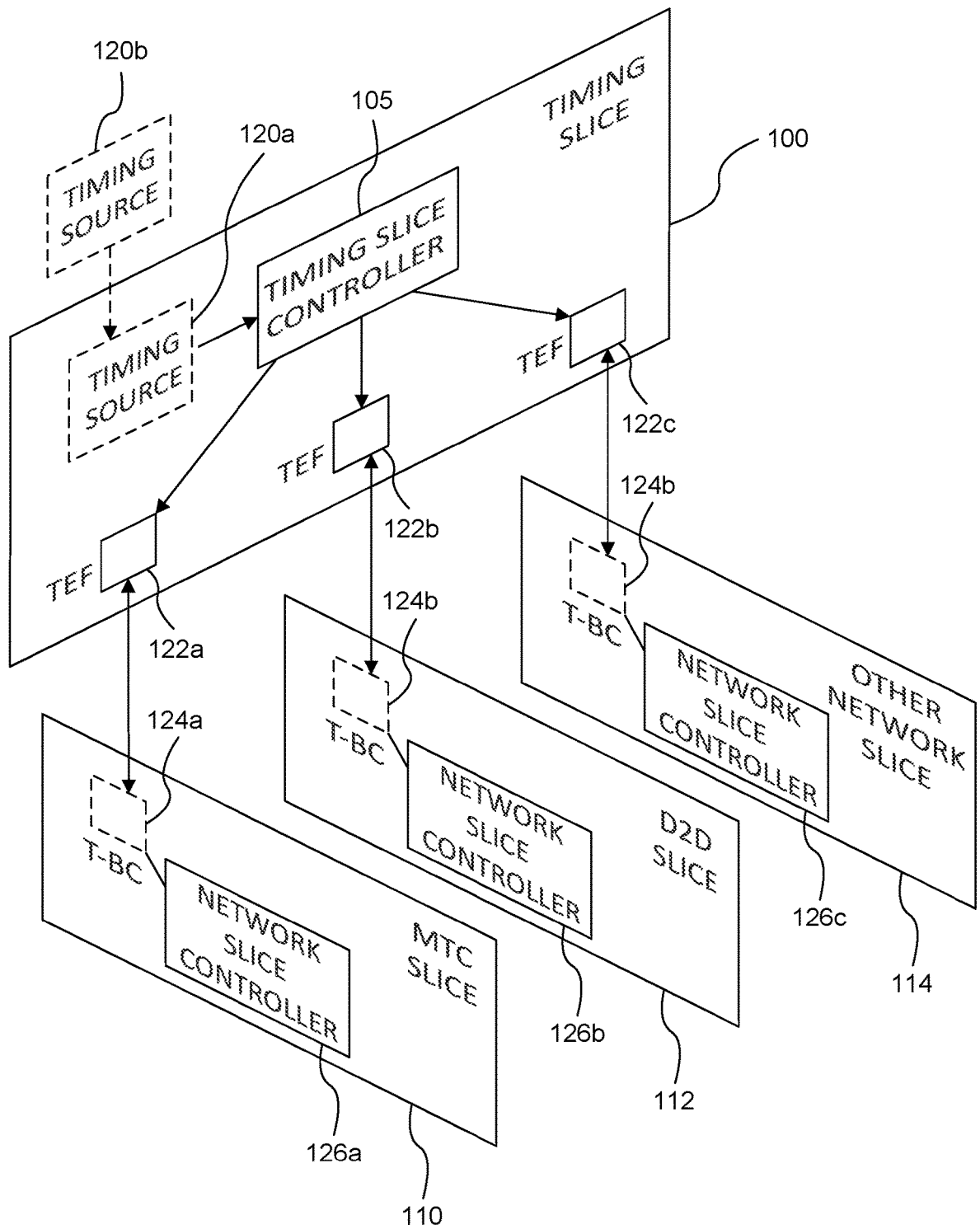
FIG. 1 illustrates of a schematic diagram of a timing slice interconnected with a plurality of network slices, in accordance with embodiments of the present invention.

Network slicing is seen as a technology can be used to enable 5G networks. A network slice may represent portions of the resources of the radio access network, core network or both, that are allocated to support a specific group of users. A network slice controller is the entity responsible for interacting with the various network elements in order to create, manage or orchestrate the slice. Within radio access networks, base station architecture has evolved towards a distributed base station model in order to enable optimization of a network in terms of cost and operations. In this model, the antenna unit may be physically separated from the device that is providing the functionality of the baseband processing unit (BPU). Furthermore, with the migration of the base station towards the distributed base station model and further to the Cloud RAN (CRAN), which can be configured to centralize the base band processing and take advantage of data centre technology, the distance between the antenna port and the antenna may become large and thus separated from the base station clock. Furthermore, for a particular network slice there can be varying physical distances between different functional entities or network functions that are necessary for the functionality of the particular network slice. Synchronization of these base stations is an important requirement of modern radio access networks and synchronization can be critical to support advanced network functions, including functional entities that can enable network slicing.

The present invention provides methods and apparatus for the provision of timing for a communication network. In particular, timing can be provided as a service to the communication network and the network slices operating thereon. This provision of timing as a service (TaaS) can enable the synchronization of operation of the various network components which in some instances can be physically placed at different locations while providing a desired functionality. According to embodiments, a timing slice is configured to provide the portion of timing resources that are associated with the delivery of timing to a slave device in an environment where multiple network slices are operating. A timing slice controller can coordinate, control and monitor timing across multiple network slices and over multiple CRAN instances. In addition, a timing slice controller can provide an interface, for example a timing exposure function (TEF), to a network entity where the network entity can request timing synchronization information from the timing slice controller to establish timing to a specific network slice end point. The network entity can then setup necessary connections within the timing network from the timing source to the requested clock in the network slice endpoint.

In further detail, network slicing refers to a technique for separating different types of network traffic which can be used in reconfigurable network architectures, such as networks employing network function virtualization (NFV). A network slice as defined in 3GPP TR 22.891 entitled "Study on New Services and Markets Technology Enablers," Release 14, Version 1.2.0, Jan. 20, 2016, is composed of a collection of logical network functions that supports the communication service requirements of particular use cases. A network slice represents portions of the resources of the radio access network and core network that are allocated together to support a specific group of users. With regard to 5G networks, different application scenarios may exist including, for example, enhanced mobile broadband communication (e.g. smart phones), massive machine-type communications (e.g. MMTC or Internet of Things (IoT)) or ultra-reliable/low latency communication. While some aspects of the network may be shared (e.g. billing or backhaul), certain characteristics of these networks (e.g. attachment methods or the air interface format), make supporting these communication services on a single traditional wireless network difficult. However, a network slice offers an opportunity to define an end-to-end service that can include the appropriate resources to enable a specific type of service, but managed as a unified network. Typically, a network slice controller is the entity responsible for interacting with the various network elements in order to create, or orchestrate, the network slice.

To provide context to aid in the understanding of network slicing, and the concept of a network slice, it is helpful to understand that in heterogeneous networks in addition to a plurality of different types of nodes covering different locations, different infrastructure providers may own different parts of what is considered as an access network (or even parts of a core network). A Telecommunications Service Provider (TCSP), who provides service to a final customer or user equipment, such as an M2M Service Provider (M2M SP) or another virtual Service Provider (SP), may wish to provide a simple network to the SP. As such, the TCSP will create a virtual network having virtual nodes and virtual links between the nodes. The SP only needs to interact with the virtual network (VN). However, the VN (both nodes and links) need to be mapped to physical infrastructure. The VN may only use a subset of the physical nodes, and each physical node that the VN uses may not be fully used by that VN. It should also be understood that the SP may make use of more than one TCSP, allowing it to create a virtual network spanning across different networks, effectively having a network slice that is a superset of the resources of a single TCSP. If certain bandwidth requirements are set for each logical link, then percentages of physical links are allocated to create the virtual link. This may also include aggregating links to create a logical link of greater capacity than a single physical link. Network slices are the collection of the allocation of the resources in what may be different networks. A network slice, from the perspective of an infrastructure provider may only include resources in the infrastructure provider network. From the perspective of the SP, a virtual network slice is a substantially seamless aggregation of all network slices that the SP uses. The TCSP deals with seamlessly connecting the different network slices of infrastructure provider resources, along with network slices from the TCSP resources, to create the VN. It should be understood that at various points in time, the total allocation of network slices for different resources may not add up to 100%. If the value is less than 100% it means that the resource is not fully utilized. If it exceeds 100% it may be a network design choice knowing that there is a very low likelihood that all customers will be using a resource at the same time. It should be understood that the size and nature of different network slices can vary with time as new resources come online or as existing resources are re-allocated. The SP may typically be unaware of the changes in the physical infrastructure that is utilized by the network slice on the VN.

Network slicing can relate to the ability of a network, such as a $5^{th}$ generation communication network accessible by mobile devices, to provide multiple logical network slices on demand, with each network slice operating as a substantially separate network viewed as a service. The capabilities and operating parameters of each network slice may be customized to the service requirements. Configuration of the network slices may include one or more of: software defined networking, network function virtualization and network orchestration.

A portion of communication network resources may be allocated for use by a network slice. These resources can include radio access communication resources, node-to-node communication resources, computational resources, and storage resources. Resources may further include network infrastructure resources such as management plane resources, control plane resources, and data plane resources. In some instances, the data plane resources are also known as user plane resources. Resources may include hardware resources, such as portions of computer processing capabilities, or communication resources, such as portions of communication links partitioned by time, frequency, spreading code, or a combination thereof. Nodes in the same network slice may be connected by logical pipes, for example.

As previously discussed, synchronization of base stations can be an important requirement of modern radio access networks. Synchronization can be critical to support advanced network functions that are necessary in order to support the ability to provide high bandwidth. For example, these advanced network functions can include, Carrier Aggregation (CA), Coordinated Multi-Point (CoMP) and inter-carrier interference coordination (ICIC). Typically, base stations are synchronized by an external timing signal at the base station itself. In some cases, this timing source may be from a co-located Global Navigational Satellite System (GNSS) receiver, for example the Global Positioning System (GPS). However, security issues related to GNSS signals, for example their vulnerability to jamming and spoofing, have resulted in the need to distribute synchronization over a wire-based or optical-based network. In general, a separate synchronization network can be utilized together with separate timing components (e.g. clocks) and associated protocols, such as PTP.

Synchronization requirements for the air interface have been defined in terms of frequency, phase and time when measured at the output of the base station, and more specifically at the output port connecting to the antenna. Synchronization performance is generally dependent on the internal clock of the base station and the length of the cable between the base station output and the antenna, as this separation distance can add delay and therefore impact the timing relationship between the signal at the output port and the signal at the air interface. In an integrated base station, this distance is short and therefore the delay can be considered to be insignificant.

However, with the migration of the base station towards the distributed base station model and further to the centralize RAN, the distance between the antenna port and the antenna may become large and thus separated from the base station clock. In some instances the front haul network may be carried over an intermediate network technology, including packet technology, which may further impact the ability to control synchronization.

Furthermore, for a particular network slice there can be varying physical distances between different functional entities or network functions that are necessary to provide the functionality of the particular network slice. As such, synchronization of these different functional entities can be critical to support these network functions that can enable network slicing.

The deployment of a synchronization distribution network was required for technologies such as Synchronous Digital Hierarchy/Synchronous Optical NETwork (SDH/SONET), but is based on the distribution of frequency only. In this situation, the entire network becomes effectively timed from a single common clock, for example under normal operation while excluding failures which can segment the network.

As the advances in network technology is beginning to require accurate time and phase distribution, in addition to frequency distribution, distribution networks for time and phase are being developed and deployed based on the use of packet protocols operating between a master clock and a slave clock, with possible distribution through an intermediate network. This time distribution network may also utilize the existing frequency based network or a network based on Synchronous Ethernet (SyncE), for added stability. As such a single common time clock is present in the network.

Since the PTP protocol occupies relatively low bandwidth, the protocol messages are carried over existing links which also carry user and control data associated with the RAN. As noted above, a slice represents a portion of the resources that can be allocated to a specific service. However in this case, the PTP protocol represents the transmission of data between a shared device (a master clock) and a device that may be specific to a slice (e.g. a base station). Furthermore, to add additional complexity, a base station may provide service to a plurality of network slices. In this sense, the network can be apportioning or sharing network resources a plurality of network slices.

The location of the clock, which may be considered an end point or termination point of the synchronization path, may vary. In some cases, the clock may be in the Baseband Unit (BBU), while in other cases, the implementation thereof may mandate that an additional clock be deployed in a BBU and a Remote Radio Unit (RRU). This variation in implementation may be dependent on the type of transport technology that is used within the front haul network (e.g. Optical Transport Network (OTN), packet or fibre) as different transport technologies can have different associated latencies.

Sharing the synchronization signals, which can be considered the resource, is common in existing synchronization networks that are based on the distribution of physical layer frequency, for example SONET and SyncE. In this situation, the information that is carried in the frequency distribution network represents an instant of time that a symbol transitions from one value to another value. In this case, duplication of the signal can be done using a distribution amplifier.

However, in the case of time distribution using a protocol or frequency distribution using a protocol, simple duplication is not possible. In this case, the signal transmitted between the master device and slave devices does not represent the synchronization signal per se but contains information that is used to construct the timing signal. If the synchronization signal is phase or time, then information from both directions is required. However, if the synchronization signal is only frequency, this synchronization signal can derived from the packet information and as such information from only one direction is needed.

In the case of packet transfer, since there is a dependency on the termination device (i.e. the slave device), simple duplication of the signal is not possible. In this case duplication of the synchronization signal can require duplicate point-to-point protocol sessions to be developed. Further, in a case were the termination device may be located in different user slices, there may be a need for address translation of the synchronization signal transmitted using packet transfer, as the individual slave clocks within each respective slice can have a different address space.

According to embodiments, a timing slice represents the portion of timing resources that are associated with the delivery of timing to a slave device in an environment where multiple slices are operating. A timing slice controller can be configured to coordinate, control and monitor timing across multiple slices and over multiple CRAN instances.

Since timing devices within the network are deployed to distribute timing network wide, according to embodiments the timing slice controller is configured to operate over multiple network slices in order to enable the clocks at the endpoint each of the network slices to derive their respective time base such that it is traceable to Coordinated Universal Time (UTC). For example, the provided timing information can be used by each of the individual slices to independently derive an estimate of UTC.

According to embodiments, the timing slice controller can operate at a level that is above the network entity, for example a network slice controller, in order to provide network wide coordination of timing. It is understood that the network coverage provided by the timing slice may be different than the network coverage provided by a traffic slice, since a one-to-one relationship between timing end points and user or transmission end points may not exist. For example, while the termination of timing is assumed to be within a user slice, the source of the time may be outside of the timing slice, and possibly in a part of the network that is not part of the RAN and therefore not controlled by a slice controller associated with the RAN.

FIG. 1 illustrates of a schematic diagram of a timing slice interconnected with a plurality of network slices, in accordance with embodiments of the present invention. The timing slice 100 includes a timing slice controller 105 which is configured to coordinate, control and monitor timing across a plurality of network slices, for example the Machine Type Communication (MTC) slice 110, the Device to Device (D2D) slice 112 and the other network slice 114. The timing slice controller 105 receives a base time reference signal from a timing source 120a, 120b. In some embodiments, the timing source can be resident on the timing slice 120a. However in other embodiments the timing source 120b can be external to the timing slice and this external timing source provides the necessary base time reference signal. The timing slice controller 105 is further configured to expose, for example make accessible to, a timing exposure function (TEF) 122a, 122b, 122c to each of the network slices. A TEF can provide interconnectivity between the timing slice and one or more of a plurality of network slices. In some embodiments, the TEF can be instantiated by use of a Network Capability Exposure Function (NCEF) or Service Capability Exposure Function (SCEF) which is an entity within the 3GPP architecture for network capability exposure that provides a means to securely expose the services and capabilities provided by 3GPP network interfaces. The respective TEF associated with a network slice, appears to the network slice controller to be an entity that is resident on the particular network slice, while actually being resident or associated with the timing slice. As illustrated the TEF can be instantiated to mirror the functionality of a Timing Boundary Clock (T-BC) 124a, 124b, 124c, which in some embodiments can be a telecom boundary clock. In some embodiments, the TEF can be substantially directly connected with the one or more network slice controllers for which it is providing timing synchronization information without appearing as a T-BC in the respective network slice.

According to an embodiment, the TEF provides a means for the communication between the network slice controller 126a, 126b, 126c and the timing slice controller in order for the provision of timing synchronization information to the respective network slice controller. In some embodiments, the timing slice controller can be configured to provide the desired computational functionality for determination of the synchronization timing for provision to the network slice controller for suitable operation of the network slice. This separation of the timing computation from the network slice itself can enable the instantiation of the network slice with fewer network resources, as timing computation is not required directly on the network slice. As such the timing slice is providing timing as a service (TaaS) to the plurality of network slices.

Figure 2:
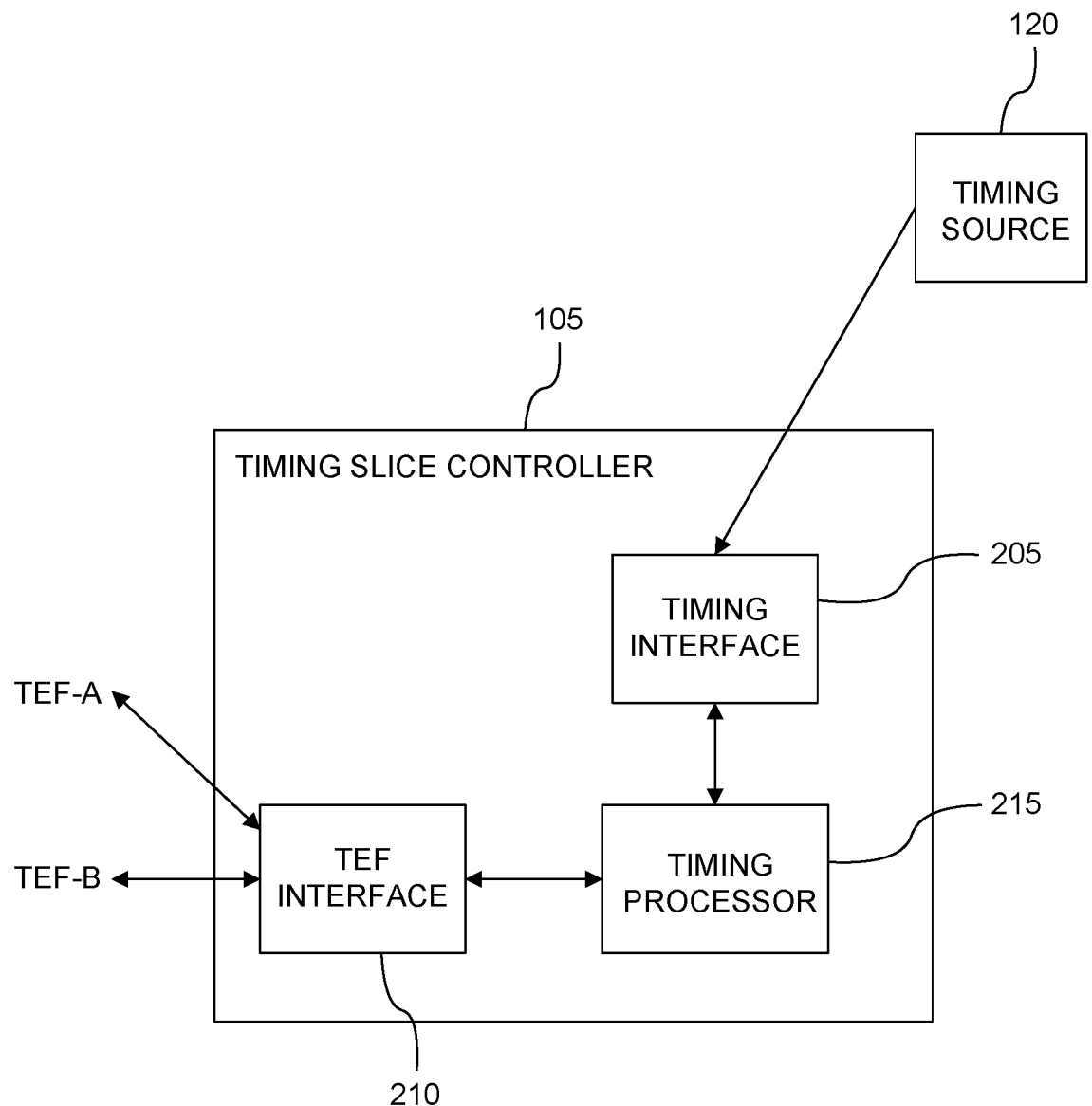
FIG. 2 illustrates a schematic diagram of a timing slice controller, in accordance with embodiments of the present invention.

FIG. 2 illustrates a schematic diagram of a timing slice controller, in accordance with embodiments of the present invention. The timing slice controller 105 includes a timing interface 205 that communicates with the timing source 120 for the provision of a base time reference signal. As is previously understood the timing source can be resident on the timing slice or external to the timing slice. The timing slice controller further includes a TEF interface 210 that communicates with the plurality of network slices associated with the timing slice. In some embodiments, the TEF interface 210 enables the transmission of network slice configuration parameters to the timing processor 215 and further enables the transmission of timing synchronization information to the respective network slices.

According to embodiments, the timing processor can be configured as a single processor, however the functionality of the timing processor can be provided by a plurality of processors operatively connected within the timing slice. According to embodiments, the timing slice can be allocated the required communication network resources necessary to provide the desired functionality, for example hardware resources such as portion of computer processing capabilities and communication resources.

According to embodiments, the timing processor is communicatively connected with the timing interface and the TEF interface to receive configuration parameters therefrom, which can relate to base time reference signals, network slice configuration parameters and other information, which can be used for the determination and evaluation one or more timing synchronization information.

According to embodiments, a timing slice controller can be configured to provide timing as a service to multiple communication network domains. According to some embodiments, a timing slice controller can provide timing as a service to multiple network providers, for example multiple Telecommunications Service Providers (TCSP).

Figure 3:
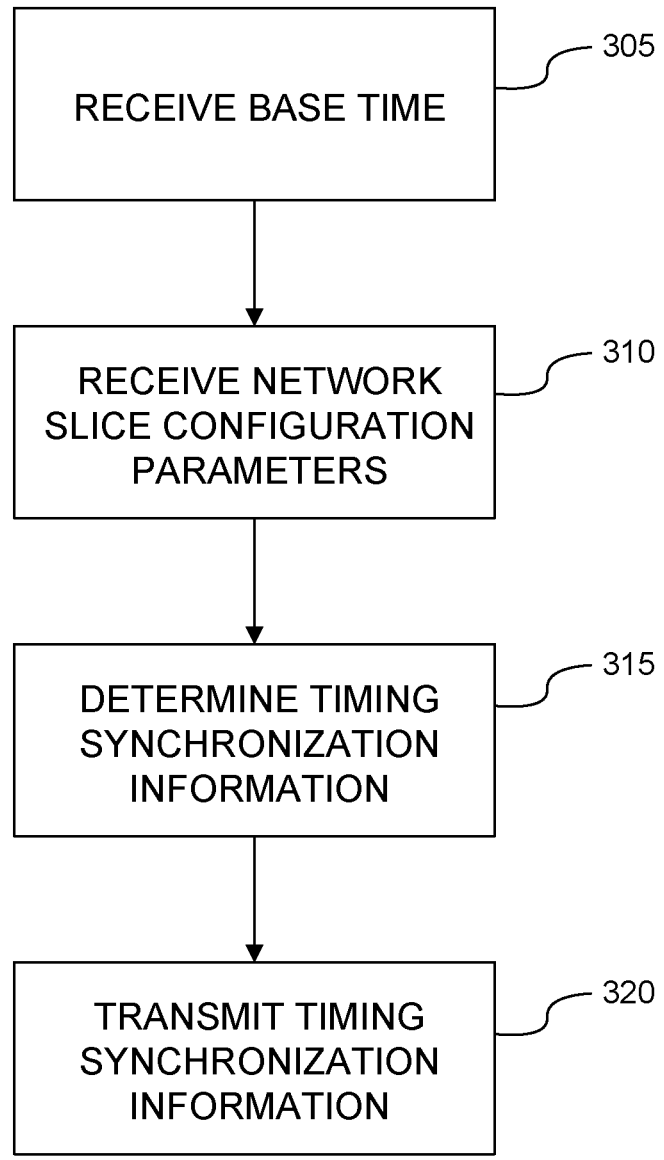
FIG. 3 illustrates a method for provision of timing to a communication network, in accordance with embodiments of the present invention.

FIG. 3 illustrates a method for the provision of timing to a communication network, in accordance with embodiments of the present invention. As illustrated, the timing slice controller receives a base time reference signal 305 and network slice configuration parameters 310. For example, the network slice parameters can include the one or more addresses of the network elements that are acting as timing devices for the network slice. In some embodiments, the timing slice controller receives the base time reference signal from a base time source that is resident within the specific timing slice associated with the timing slice controller. In some embodiments, the timing slice controller receives the base time reference signal from a base time source that is external to that specific timing slice. The base time reference signal and the network slice configuration parameters are used at least in part to determine 315 one or more timing synchronization paths and to generate timing signals. For example, the network slice configuration parameters associated with a particular network slice can include an indication of a physical distance between different functional entities of the network slice and communication characteristics, for example precision time protocol (PTP) messages to be used and respective PTP message rates, of different portions of the network slice. According to embodiments, these network slice configuration parameters can be used to determine and account for these characteristics during the evaluation and determination of the timing synchronization information. Upon the determination of the timing synchronization information, the timing controller transmits 320 this information to the appropriate network slice via the TEF.

According to embodiments, a timing slice controller will receive a request from a network entity to provide timing to a network slice. It will be understood that a network entity can be a network slice controller, a network function associated with a network node, a server associated with the network slice, an access node associated with a network slice, a radio interface associate with a network slice or other device or network function associated with the network slice. The information that is provided as slice configuration parameters can include one or more of the location of the end-point, the type of interface and the location of the one or more timing sources that may be present within the network slice which are requesting timing as a service. In some embodiments, the request for timing as a service (TaaS) can also include a request for a specific service performance level. For example, a specific service performance level requirement may result in restrictions on the timing paths that can be created by the timing slice controller to satisfy that particular request for timing as a service. It is understood that a timing path can be indicative of a timing off-set which may require adjustment to synchronize timing between a timing end-point and a base time source. Furthermore, each timing end-point may have a different timing off-set relative to the base time source. According to some embodiments, the network entity which transmits the request to provide timing is present within the network slice. According to other embodiments the network entity that transmits the request to provide timing is external to the network slice.

According to embodiments, the timing slice controller has access to a time base, for example a base time reference signal or base timing source, and requires the network topology to calculate a timing path to the requested end-point. According to embodiments, the network topology can be represented by the one or more network configuration parameters. If the timing slice controller does not have access to the network topology, the timing slice controller can make a request to the appropriate underlying communication network management system or network slice controller. Once the network topology information is available, the timing slice controller can calculate the timing path from the timing slice controller's time-base to the requested timing end-point. The timing slice controller can then use timing path information, which can include one or more of distance information and other clock parameters such as holdover performance, to determine the timing synchronization information in order to satisfy the service performance level requested. As an example the timing synchronization information can include PTP protocol parameters such as message rate. The timing slice controller will subsequently transmit the timing synchronization information to the necessary network elements in order to provide timing to the requested timing end point.

Figure 4:
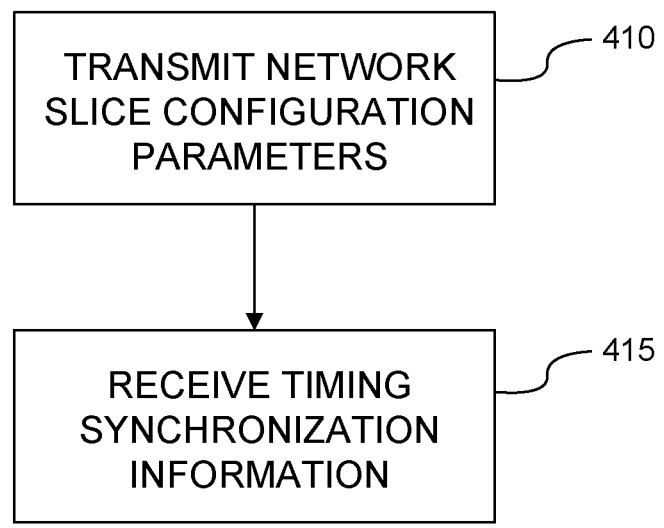
FIG. 4 illustrates a method for synchronizing timing for a network slice with a base timing source, in accordance with embodiments of the present invention.

FIG. 4 illustrates a method for synchronizing timing for a network slice with a base timing source, in accordance with embodiments of the present invention. As illustrated, the network entity resident on a network slice transmits network slice configuration parameters 410 to a timing slice controller. For example, the network slice configuration parameters can include the one or more addresses of the network elements that are acting as timing devices for the network slice, information indicative of the network topology, information indicative of a distance between different functional entities of the network slice and communication characteristics of different portions of the network slice. In some embodiments, the communication characteristics of different portions of the network slice include PTP messages to be used and respective PTP message rates. The network entity resident on a network slice subsequently receives timing synchronization information 415 which can provide the respective network entity with the information necessary for the network entity's synchronization with the base timing source.

Figure 5:
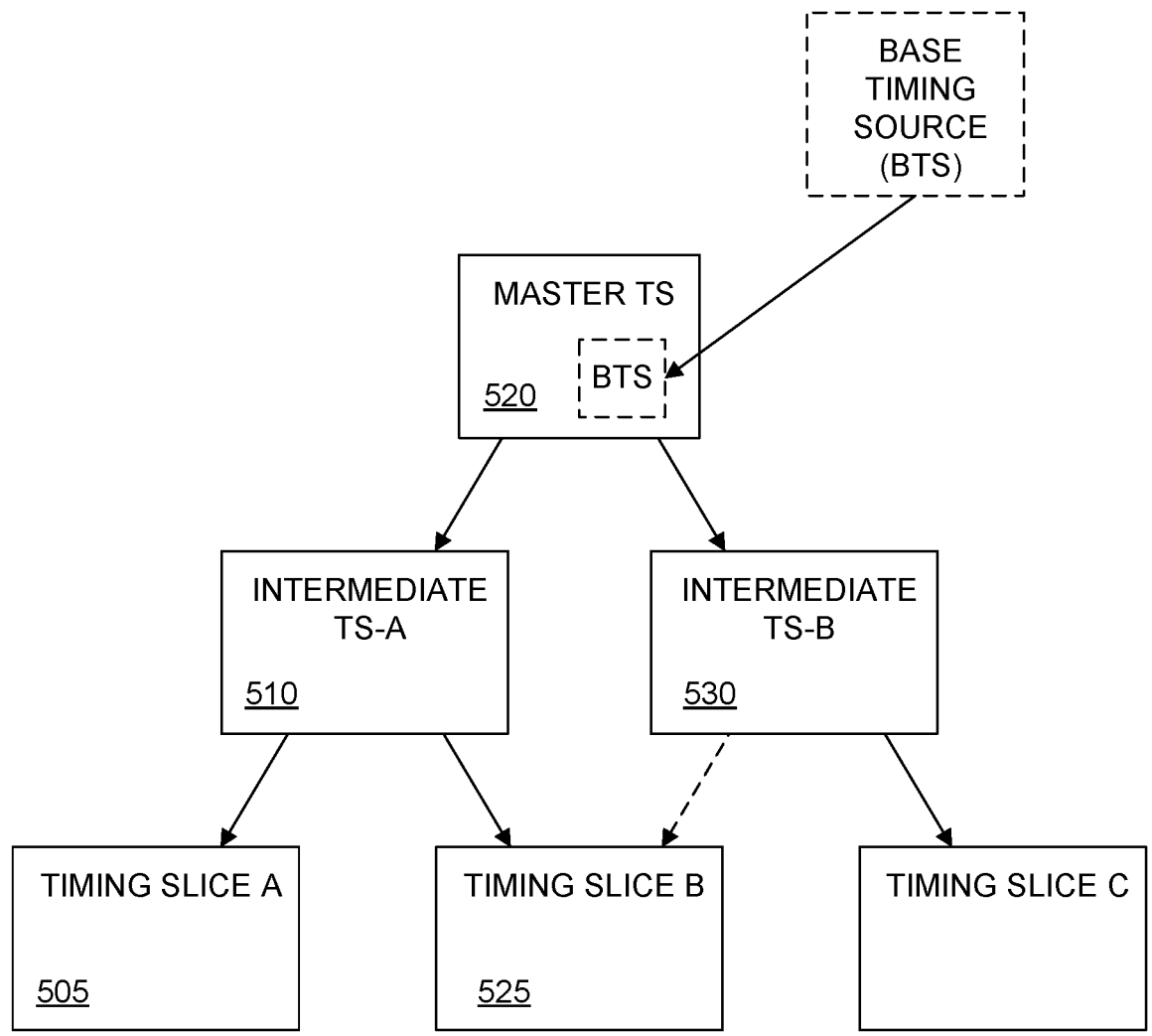
FIG. 5 illustrates a schematic diagram of a hierarchy of timing slices, in accordance with embodiments of the present invention.

FIG. 5 illustrates a schematic diagram of a hierarchy of timing slices, in accordance with embodiments of the present invention. According to some embodiments, a plurality of timing slices exist in a hierarchical configuration. For example, timing slice A 505 can receive timing information or instructions or both from intermediate timing slice A 510, which can receive timing information from a master timing slice 520. In some embodiments, a timing slice can optionally receive timing information for multiple other timing slices. For example, timing slice B 525 can receive timing information from intermediate timing slice A 510 and optionally receive timing information from intermediate timing slice B 530. According to embodiments, the hierarchy of the timing slices can be dependent on the geographical location or other parameter.

Figure 6:
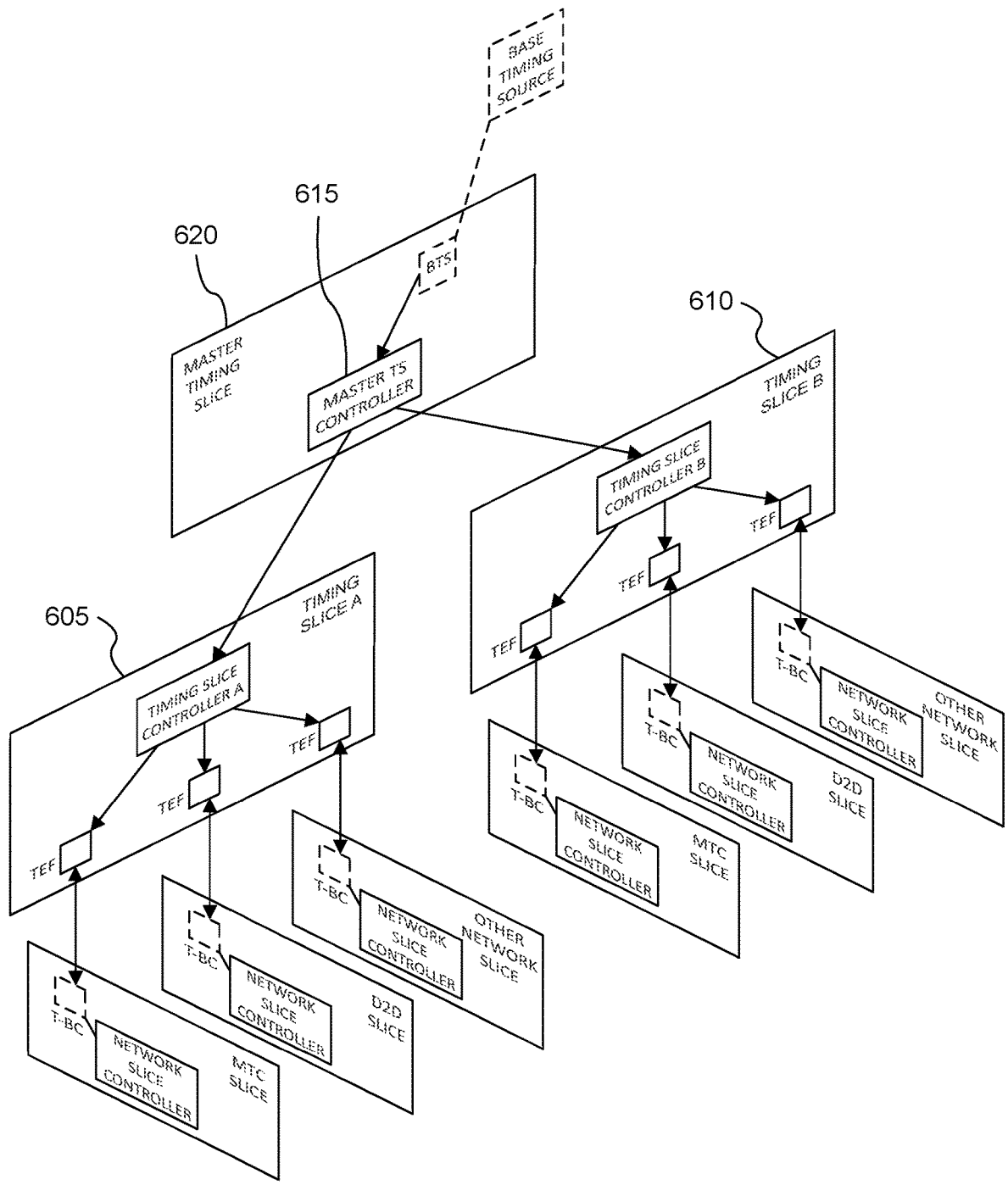
FIG. 6 illustrates a schematic diagram of a hierarchy of timing slices, in accordance with embodiments of the present invention.

FIG. 6 illustrates a schematic diagram of a hierarchy of timing slices, in accordance with embodiments of the present invention. In FIG. 5, there is illustrated two slave timing slices, namely timing slice A 605 and timing slice B 610 each of provide timing as a service to a plurality of network slices. Each of these slave timing slices, and in particular their respective timing slice controller, are provided with timing information by a master timing slice controller 615 resident in a master timing slice 620. It will be readily understood that while it is a master timing slice that provides the timing information, the master timing slice may be an intermediate timing slice, which in turn receives timing information from a timing slice at a higher level within a hierarchy, for example as illustrated in FIG. 5. Also as illustrated in FIG. 6, the master timing slice controller can receive a base time signal from a base timing source that is either resident within in the master timing slice or external to the master timing slice.

Figure 7:
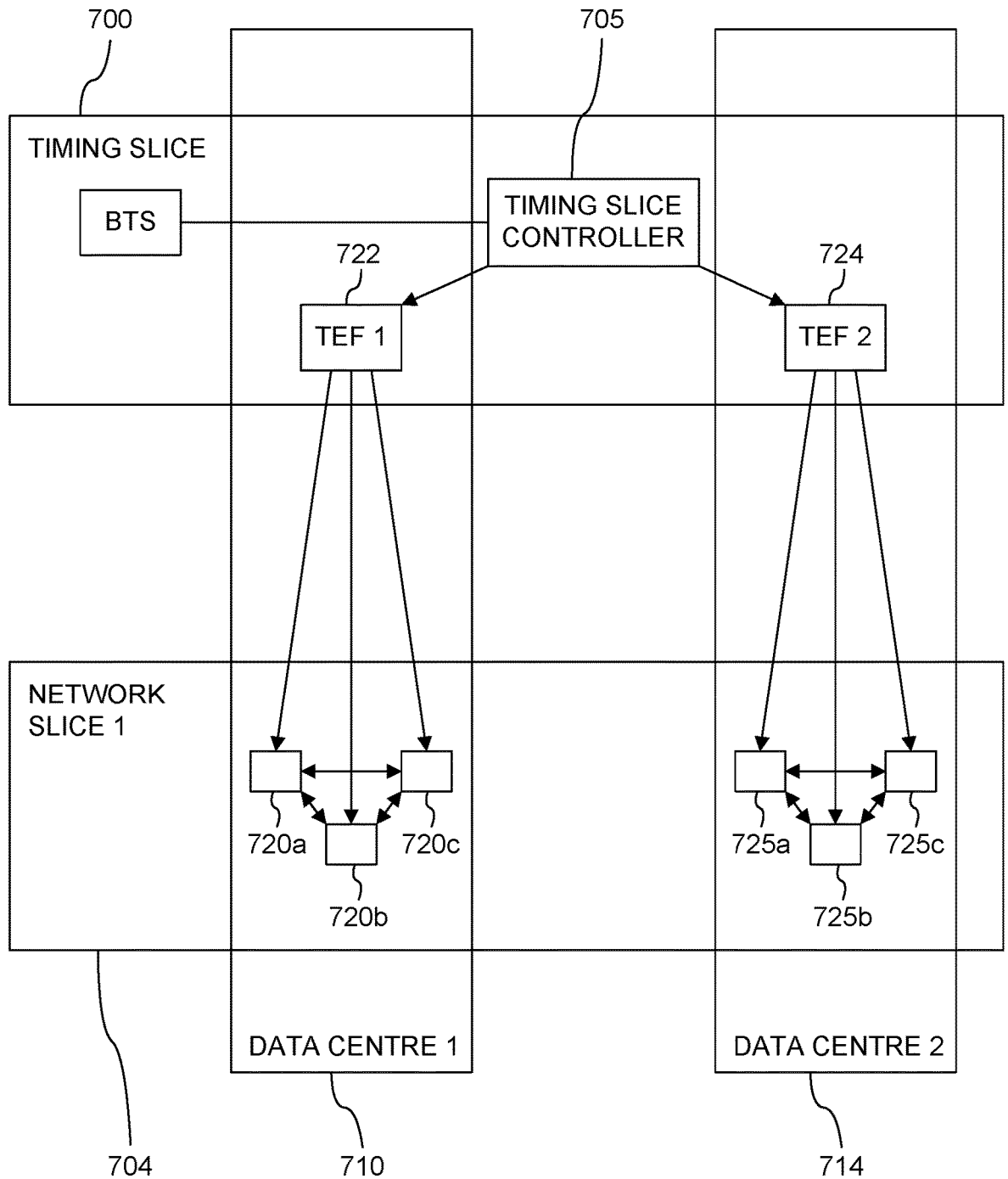
FIG. 7 illustrates of a schematic diagram of a timing slice interconnected with a network slice that is instantiated using network entities resident in multiple data centres, in accordance with embodiments of the present invention.

FIG. 7 illustrates of a schematic diagram of a timing slice interconnected with a network slice that is instantiated using network entities resident in multiple data centres, in accordance with embodiments of the present invention. The timing slice 700 includes a timing slice controller 705 which is configured to coordinate, control and monitor timing across the network slice 704, which is instantiated using network entities 720*a,b,c*, resident in Data Centre 1 710 and network entities 725*a,b,c*, resident in Data Centre 2 slice 714. As would be understood these network entities can be servers or other computing devices which are being used to provide the computational power for the instantiation of the plurality of network functions for the provision of the network slice. The timing slice controller 705 receives a base time reference signal from a timing source 720. In some embodiments, the timing source can be resident on the timing slice, as illustrated in FIG. 7. However in other embodiments the timing source can be external to the timing slice and this external timing source provides the necessary base time reference signal to the timing slice controller. The timing slice controller 705 is further configured to expose, for example make accessible to, a timing exposure functions (TEF1, TEF 2) 722, 724 to each of the network entities resident in Data Centre 1 and Data Centre 2. A TEF can provide interconnectivity between the timing slice and one or more of a plurality of network entities and further enables the provision of timing synchronization information to each of the network entities with which that TEF is associated. In some embodiments, the TEF can be instantiated by use of a Network Capability Exposure Function (NCEF) or Service Capability Exposure Function (SCEF) which is an entity within the 3GPP architecture for network capability exposure that provides a means to securely expose the services and capabilities provided by 3GPP network interfaces. According to embodiments, each of the network entities resident in the data centres, which are in communication with a TEF, include a network switch or other functional component which provides the network entity with the capabilities to process the timing synchronization information received from the TEF.

Figure 8:
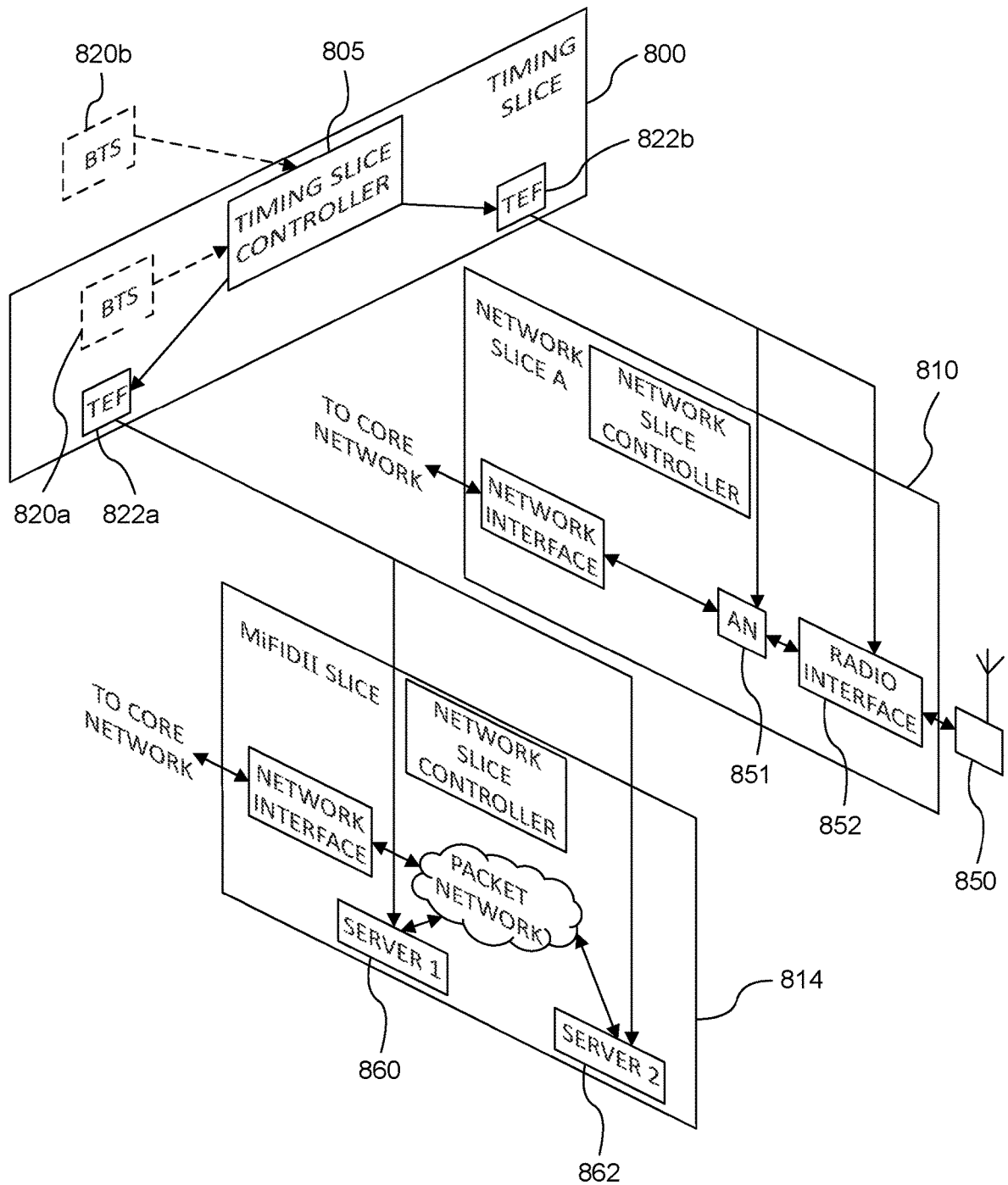
FIG. 8 illustrates of a schematic diagram of a timing slice interconnected with a plurality of network slices, in accordance with embodiments of the present invention.

FIG. 8 illustrates of a schematic diagram of a timing slice interconnected with a plurality of network slices, in accordance with embodiments of the present invention. The timing slice 800 includes a timing slice controller 805 which is configured to coordinate, control and monitor timing across a plurality of network slices, for example network slice A 810 and the Mi FID II network slice 814. It is understood that a Mi FID II network slice (Markets In Financial Investments Directive) is reflective of legislation that regulates firms who provide services to clients linked to financial instruments, for example shares and bonds, and the venues where those financial instruments are traded. As illustrated network slice A 810 is configured to provide wireless connectivity between a base station 850 and a core network.

With further reference to FIG. 8, the timing slice controller 805 receives a base time reference signal from a timing source 820*a*, 820*b*. In some embodiments, the timing source can be resident on the timing slice 820*a*. However in other embodiments the timing source 820*b* can be external to the timing slice and this external timing source provides the necessary base time reference signal. The timing slice controller 805 is further configured to expose, for example make accessible to, a timing exposure function (TEF) 822*a*, 822*b* to each of the network slices. In this embodiment, the TEFs are exposed directly to network entities resident in network slice A 810 and the Mi FID II network slice 814. As illustrated, in this embodiment, TEF 822*b* provides timing synchronization information to the access node (AN) 851 and the radio interface 852 resident on network slice A 810. Furthermore, TEF 822*a* provides timing synchronization information to server 1 860 and server 2 862 resident on the Mi FID II network slice 814. According to embodiments, access node (AN) 851, the radio interface 852, server 1 860 and server 2 862, which are in communication with a TEF, include a network switch or other function entity. The network switch or other functional component provides the network entity associated therewith, with the capabilities to process the timing synchronization information received from the TEF.

Figure 9:
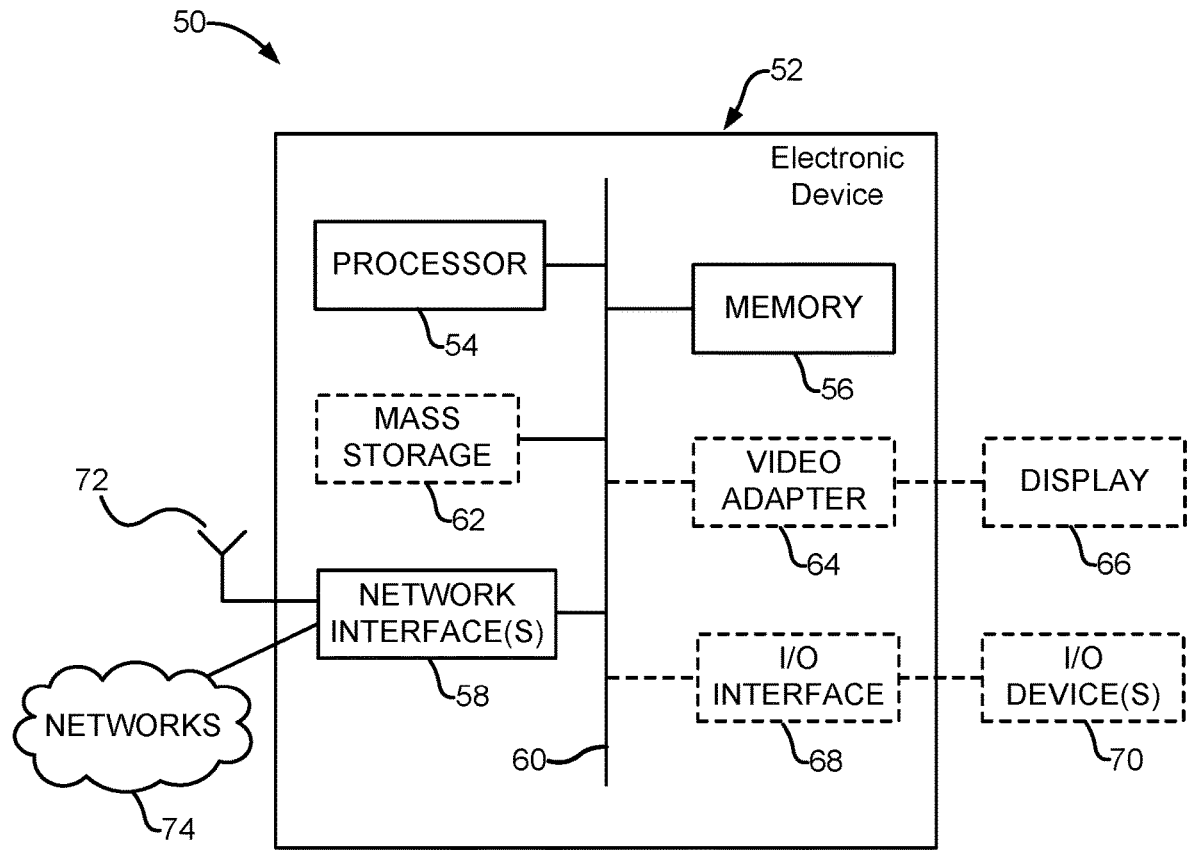
FIG. 9 is a block diagram of an electronic device within a computing and communications environment that may be used for implementing devices and methods in accordance with representative embodiments of the present invention.

FIG. 9 is a block diagram of an electronic device (ED) 52 illustrated within a computing and communications environment 50 that may be used for implementing the devices and methods disclosed herein. In some embodiments, the electronic device may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a Public Land Mobility Network (PLMN).

In other embodiments, the electronic device may be a device that connects to the network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 52 typically includes a processor 54, such as a Central Processing Unit (CPU), and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 9, network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. Moreover, in some instances the present invention has been described using reference to terminology specific to LTE, it is readily understood that the use of these terms is meant to be illustrative and not limiting. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for provisioning timing to a first network slice of a communication network, the method comprising:
   receiving, by a timing slice controller within a timing slice different than the first network slice, a base time reference signal, the timing slice connected to the first network slice via a timing exposure function (TEF);
   receiving, by the timing slice controller, one or more network slice configuration parameters including a location of a timing device associated with the timing slice;
   determining, by the timing slice controller, one or more timing synchronization information based at least in part on the base time reference signal and the one or more network slice configuration parameters; and
   transmitting, by the timing slice controller, the timing synchronization information to the TEF within the timing slice for delivery to a node within the first network slice, the timing synchronization enabling the node to derive a time corresponding to the base time reference signal.

2. The method according to claim 1, wherein the base time reference signal is received from a base time source resident within timing slice.

3. The method according to claim 1, wherein the base time reference signal is received from a base time source external to the timing slice.

4. The method according to claim 1, wherein determining the timing synchronization information includes:
   determining a timing path between a base time and a timing end point, wherein the base time is represented by the base time reference signal; and
   calculating the timing synchronization information based at least in part on the base time reference signal.

5. The method according to claim 4, wherein calculating the timing synchronization information is further based at least in part on the timing path.

6. The method according to claim 1, wherein network slice configuration parameters are indicative of one or more of a distance between different functional entities of the first network slice and communication characteristics of different portions of the timing slice.

7. The method according to claim 6, wherein the communication characteristics of different portions of the timing slice include precision time protocol (PTP) messages to be used and respective PTP message rates.

8. The method according to claim 1, further including receiving a request from a network entity within the first network slice for provisioning timing to the first network slice of the communication network.

9. The method according to claim 8, wherein the request includes one or more network configuration parameters.

10. The method according to claim 1, wherein the timing slice controller receives a request for the one or more network configuration parameters.

11. A timing slice controller for provisioning timing to a first network slice of a communication network, wherein the timing slice controller is within a timing slice that is connected to the first network slice via a timing exposure function (TEF), the timing slice controller comprising:
    a processor; and
    machine readable memory storing machine executable instructions which when executed by the processor configure the timing slice controller to:
      receive a base time reference signal;
      receive one or more network slice configuration parameters including a location of a timing device associated with the timing slice;
      determine timing synchronization information based at least in part on the base time reference signal and the one or more network slice configuration parameters; and
      transmit the timing synchronization information through the timing slice to the TEF within the timing slice for delivery to a node within the first network slice, the timing synchronization enabling the node to derive a time corresponding to the base time reference signal.

12. The timing slice controller according to claim 11, wherein the base time reference signal is received from a base time source resident within the timing slice.

13. The timing slice controller according to claim 11, wherein the base time reference signal is received from a base time source external to the timing slice.

14. The timing slice controller according to claim 11, wherein when determining the timing synchronization information, the machine executable instructions which when executed by the processor configure the device to:
    determine a timing path between a base time and a timing end point, wherein the base time is represented by the base time reference signal; and
    calculate the timing synchronization information based at least in part on the base time reference signal.

15. The timing slice controller according to claim 11, wherein network slice configuration parameters are indicative of one or more of a distance between different functional entities of the first network slice and communication characteristics of different portions of the first network slice.

* * * * *